United States Patent
Dreher

[15] 3,642,395
[45] Feb. 15, 1972

[54] PREFORMED WALL SECTION MOLDING APPARATUS

[72] Inventor: Edward J. Dreher, 5841 East 67th Ave., Commerce City, Colo. 80002

[22] Filed: Jan. 26, 1970

[21] Appl. No.: 5,774

[52] U.S. Cl.....................................425/109, 249/18, 249/84, 249/137, 425/89, 425/436, 425/455
[51] Int. Cl........................................................B28b 7/08
[58] Field of Search................25/1 B, 1 C, 123; 249/15, 137, 249/139, 96, 95, 83, 91, 18

[56] References Cited

UNITED STATES PATENTS

| | | | |
|---|---|---|---|
| 1,773,454 | 8/1930 | Fowler | 25/1 B |
| 1,623,625 | 4/1927 | Lake | 25/1 B |
| 3,231,646 | 1/1966 | Conder et al. | 249/96 X |
| 3,242,549 | 3/1966 | Boeglen | 249/96 X |
| 1,968,189 | 7/1934 | Bartels | 249/137 X |
| 2,807,070 | 9/1957 | Thomas | 249/15 |
| 3,255,991 | 6/1966 | Sumner | 249/137 |

*Primary Examiner*—J. Spencer Overholser
*Assistant Examiner*—B. D. Tobor
*Attorney*—Richard D. Law

[57] ABSTRACT

Molding apparatus for producing preformed brick wall sections including a tiltable flat table structure including a horizontal position for molding brick wall sections thereon and a vertical position for selectively depositing erect brick wall sections at selected locations. Detachable stay means are mounted on the table structure for maintaining the shape of the molded wall sections during erection and curing. Elongated strips are laterally positioned on the table structure for spacing the bricks and forming a mortar joint. A plastic sheet may be laid on the table to provide parting of the panel from the table. Wheels are provided for mobility, and power means are disclosed in one embodiment of the apparatus for tilting the table structure from one position to another.

4 Claims, 6 Drawing Figures

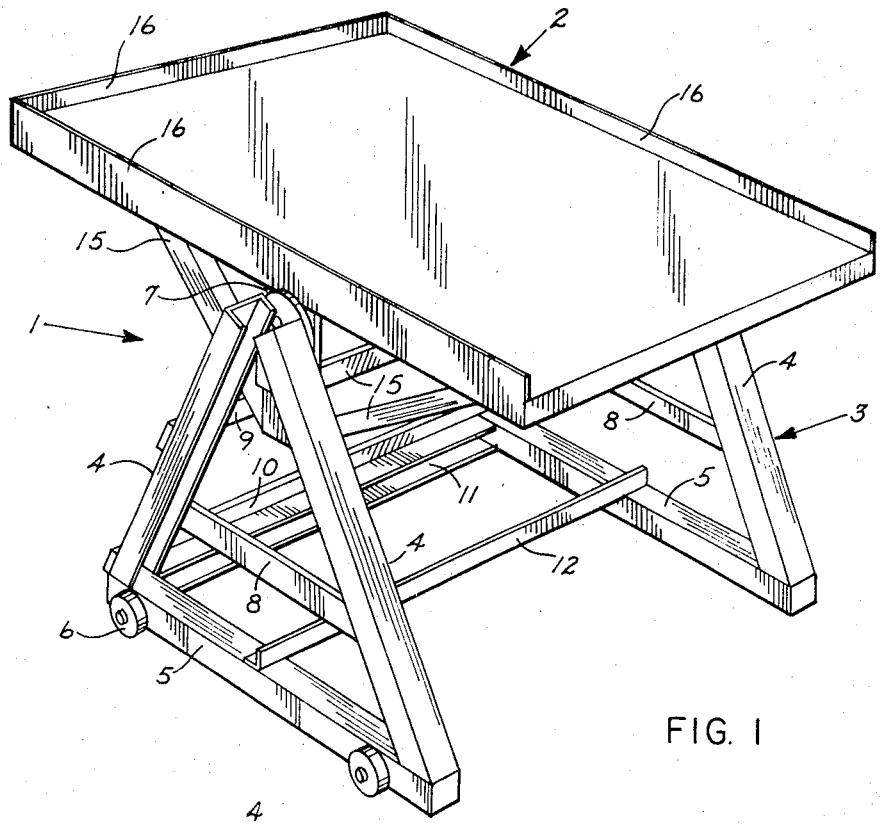
FIG. 1
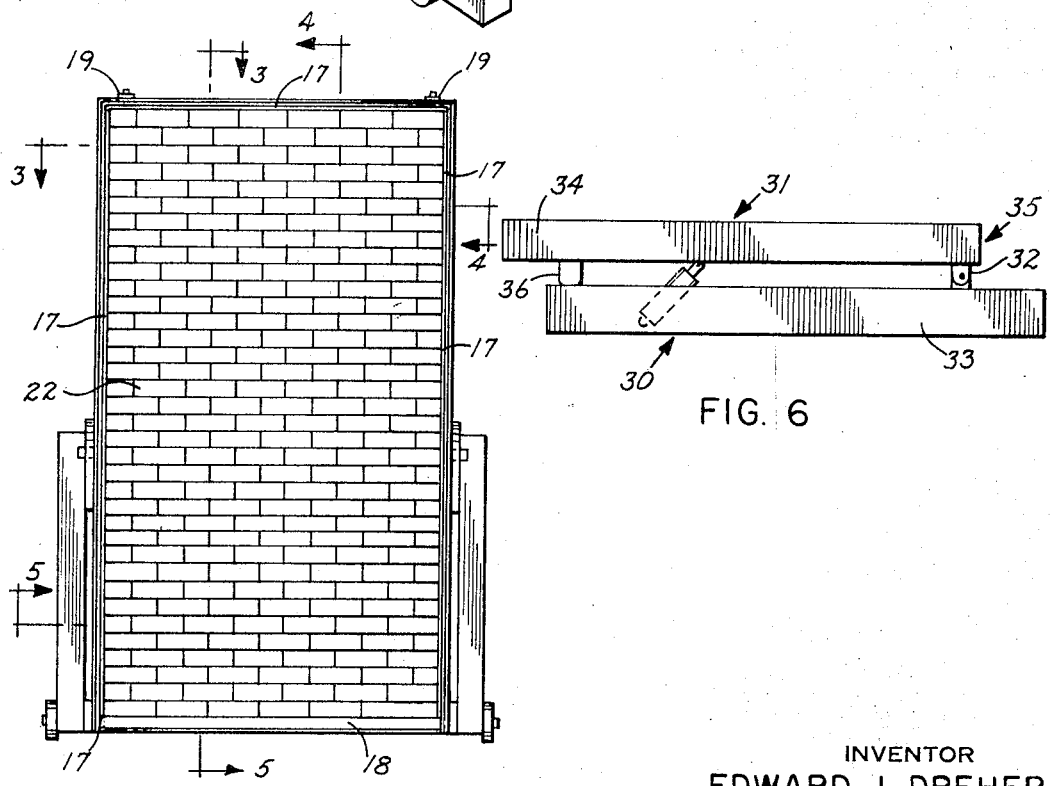
FIG. 2
FIG. 6
INVENTOR
EDWARD J. DREHER
BY
Richard D. Law
ATTORNEY

PREFORMED WALL SECTION MOLDING APPARATUS

The present invention relates to molding apparatus, and more particularly to an improved molding apparatus particularly suitable for making preformed brick panels or wall sections.

Heretofore, tile panels have been constructed by placing preformed tiles in a mold structure and appropriately applying plastic mortar, thereby to form a relatively thin tile panel. With such prior art molding apparatus, the mortar in the tile panel had to be allowed to dry completely before the panel could be removed from the mold structure. While such molding apparatus could be conceivably used for forming brick wall sections, a serious limitation results from the use of such apparatus in that a brick wall section so formed could not be removed from the mold structure until the mortar used to hold together the wall section was quite dry. Since a considerable period of time is required to harden the type of mortar used in constructing brick walls, the disadvantage is apparent that such a mold structure could not be employed to form other brick wall sections during the hardening period required for the one wall section. Therefore, a considerable number of similar molding apparatus are required if it is desired to manufacture brick wall sections at a rapid rate.

It is, accordingly, an object of the present invention to provide an improved molding apparatus particularly suitable for making brick panels or wall sections which enables the wall section formed to be removed from the mold structure while the mortar used in the wall section is still wet.

It is further an object of the present invention to provide an improved molding apparatus having stay means for holding molded brick wall sections in a predetermined shape in vertical position while the mortar used therein hardens.

It is additionally an object of the present invention to provide an improved molding apparatus which is selectively movable, and has a tilting frame for selectively erecting and depositing molded wall sections at selected locations.

It is also an object of the present invention to provide an improved molding apparatus which has a tilting frame and power means for selectively tilting the frame whereby a molded brick wall section may be selectively erected and deposited at a selected location.

In accomplishing these and other objects, there has been provided, in accordance with the present invention, two preferred embodiments of a panel or wall molding apparatus. Each molding apparatus utilizes a flat table structure which may be selectively placed in a horizontal position so that a brick wall section or panel may be formed thereon. The rails along all but one side of the table structure provide a form for molding the brick wall section. Stay means in the form of a continuous band is positioned on the table against the inside of the rails so that a brick wall section formed on the table is encircled thereby. The brick wall section is formed by laying bricks in a spaced manner on the table so as to fill the entire area encircled by the stay means. Spacing means, such as rope lengths, may be laid on the table structure to aid the laying of bricks in a spaced manner, and provide a concave mortar joint. Mortar is then poured and trowelled between the bricks and the wall is allowed to set for a predetermined period of time. In order to prevent poured mortar from running on the underface of the bricks, a plastic sheet may be laid over the rope lengths and between the bricks and the table structure. Means are provided for tilting the table structure to a vertical position so that the preformed wall section, held by the stay means, may be slid off the unrailed side of the table structure and placed in vertical position. In one embodiment of the present invention, the apparatus structure is constructed so that a wheeled table structure is manually tiltable about its center, thereby a wall section may be selectively deposited at a selected location. In another embodiment of the invention, the apparatus is constructed so that the table structure is tilted at its unrailed end, and power means are provided for selectively tilting the table structure to its vertical position. Means, also, are provided for securing the stay means in the table structure in order to hold a wall section thereon until the time at which it is desired to release the wall section therefrom and in its vertical position. Wheels are, also, provided on the each exemplary molding apparatus so that the apparatus may be moved from one location to another. Thus, there is provided an improved molding apparatus suitable for making brick wall sections and having stay means so that a wall section may be removed from the mold structure while the mortar used therein is still wet.

A better understanding of the present invention may be had from the following detailed description when read in conjunction with the accompanying drawings, in which:

FIG. 1 is a pictorial representation of one embodiment of molding apparatus in accordance with the present invention;

FIG. 2 is a front elevational view of the apparatus of FIG. 1 with the table structure thereof tilted to a vertical position and a brick wall section supported therein;

FIG. 6 is a side elevational view of another embodiment of molding apparatus in accordance with the present invention.

Figure 3:
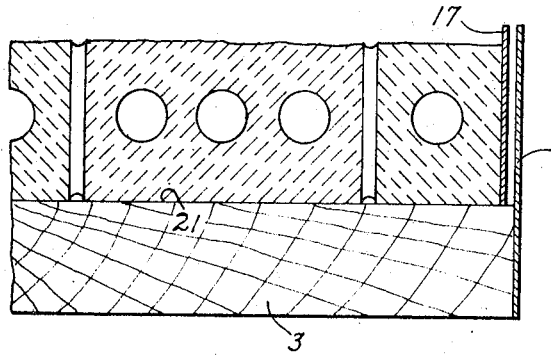
FIG. 3 is a partial cross-sectional view of FIG. 2 taken along the line 3—3.

Referring to the drawings in more detail, there is shown in FIG. 1 a molding apparatus generally designated as 1 having a rectangular shaped, tiltable table structure 2 mounted on a frame 3. The frame 3 has on each side a pair of upwardly extending A-frame-type support members 4 which are secured on a lower support member 5. Wheels 6 are mounted on the lower support member 5 so that the frame 3 may be rolled from one location to another.

The support members 4 on each side are tilted towards each other and are connected together at their upper ends by a platelike member 7. A brace member 8 is connected between the pair of members 4 forming the A-frame. Transverse running crosspieces 9 and 10 are connected between the rear members 4 to provide lateral support for the frame structure 3. Similarly, transverse running crosspieces 11 and 12 are connected between support members 5. The crosspiece 12, for reasons hereinafter explained, is located approximately directly below the center of the plate member 12.

The tiltable table 2 is pivotably mounted along its transverse centerline in the plate members 12. Table support structure 15 is provided under the table 2 for supporting the weight of a brick well section. Rails 16 which extend upwardly generally the distance of the width of a standard brick, are mounted along all sides, except the front side of the table 3 as shown in FIG. 1.

In order to mold a brick wall section, the table 3 is first tilted to its horizontal position as shown in FIG. 1. The table 3 is supported in this horizontal position by the rear member of the support structure 15 which rests upon the crosspiece 9. Positioned on the table 3 just inside and adjacent to the rails 16 is a stay means 17 as shown in FIG. 2. The stay means 17, in one form, is a continuous rectangular shaped band made of a material, such as metal, and has a nondeformable load beam, or base support, 18 across its bottom portion. The stay means 17 is attached to the rails 16 of the table 3 by means such as bolts 19. In FIG. 2, the bolts are shown attached to the upper rail 16. In another form, the nondeformable load beam 18 may be detachable from the sides of the stay, to permit removal of the top section of the stay while a brick wall panel is standing vertically on the load beam. In this manner, the preformed wall section is permitted to stand free on the beam, while upper part of the stay may be attached to another beam to form another wall section while first cures.

Figure 4:
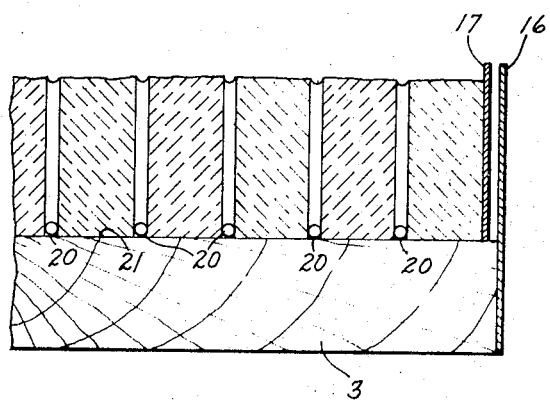
FIG. 4 is a partial cross-sectional view of FIG. 2 taken along the line 4—4.
Figure 5:
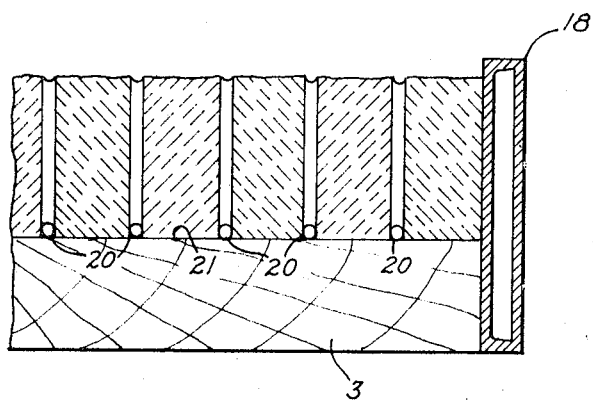
FIG. 5 is a partial cross-sectional view of FIG. 2 taken along the line 5—5.

With the table 3 in its horizontal position and the stay means 17 secured in place, spacing means 20, such as lengths of rope, may be appropriately laid laterally across the surface of the table 3 inside the stay means 17 as shown in FIGS. 4 and 5. These lengths may be secured to the surface of the table 3 or simply laid thereon. Longitudinally running short lengths of rope, though not shown in FIG. 3, could also be appropriately positioned on the table 3 so as to run lengthwise between each of the lengths of rope 20.

The ropes provide an efficient means for forming concave mortar joints between the bricks when about ¼-inch diameter rope is used. The rope should be soft and flexible to seal against the bricks and prevent oozing of mortar around the face of the brick. Also, the shape of the rope forms the concave mortar joint. Extruded soft plastic lengths may be used in place of the rope to form other types of mortar joints. The section of the lengths determines the type of joint, for example, a triangular shaped length forms a V-shaped mortar joint, a rectangular shaped length will form a stripped, rodded or raked out joint, depending on the dimensions of the section.

With the ropes or elongated strips 20 positioned on the table 3, a plastic visking or other plastic sheet 21 is placed or alternately secured across the surface of the table 3 to cover substantially the entire area encircled by the stay means 17. The plastic sheet 21 serves to cover the spacer strips 20 and prevent mortar from running onto the lower face of the bricks used in forming a brick wall section.

With the plastic sheet 21 in place, bricks 22 are then placed on the horizontally positioned table 3, and mortar is poured and trowelled between the bricks 21 thereby to form a brick wall section. Mortar may cover the bricks to increase the thickness of the wall section to greater than the thickness of the bricks. The ropes 20, in addition to providing spacing for the bricks 21, also serve to mold concave joints between the brick rows. Using fast setting mortar, the preformed section is allowed to cure for approximately 1 to 1½ hours, and then the molding apparatus 1 is rolled to a curing position where it is desired to deposit the brick wall section. Once the apparatus 1 has been appropriately positioned, the table 3 is tilted to a vertical position whereat the lower edge of the table 3 rests against the crosspiece 12. The brick wall section remains in the table structure 3 until the stay means 17 is selectively released by unbolting the bolts 19. During the time the brick wall section is vertically positioned in the table structure 3, the load beam 18 supports the brick wall section so that it retains its molded shape. The bolts 19 are then released and the brick wall section is deposited and plumbed vertical at the selected location to cure. The molding apparatus 1 may be then used with another stay means 17 to mold another brick wall section.

Thus, a brick wall section is formed and erected in a relatively short period of time; i.e., 1 to 1½ hours, while the mortar is still wet. In the vertical position and while the mortar is wet, the joints between the bricks 21 may be raked out, if desired, and any brick 21 not in correct position in the brick wall section may be tapped into place.

Referring now to FIG. 6, another embodiment of molding apparatus generally designated by the number 30 is shown. The apparatus 30 has a rectangular table structure 31 pivotably mounted on a base 33 at point 32 on the lower edge of the table structure. Rails 34 are provided around all but the lower side 35 of the table structure 31. When the table 31 is in its horizontal position, it is supported by a support member 36 on the base 33. Power means in the form of a hydraulic power cylinder means 37 are shown connected between the base 33 and the table 31 for pivoting the table 31 to a vertical position.

In operation, the molding apparatus 30 is used to form a brick wall section by employing stay means 17, spacing means 20 and a plastic sheet 21 as before described. The apparatus 30 has the advantage that since it is powered it may be used for forming larger and heavier brick wall sections. With heavier brick wall sections it may be found desirable to bolt the stay means 17 to the rails 34 at a plurality of different points located on different sides of the stay means 17. Further, in order to reinforce the rigidity of the stay means 17, reinforcing bars may be attached to run from one side of the stay means 17 to its adjacent side, thereby a substantially diamond-shaped reinforcing member may be formed.

It is noted that the above-described molding apparatus could be used for forming stone, as well as brick, walls, and the claims hereinafter are intended to cover an apparatus that would be used for molding brick, stone, or similar type walls. Also, mortar grout could be poured over one side of a molded brick wall panel to form a wall panel having brick on one side and mortar with stone particles mixed in on the other side.

Thus, there has been provided an improved molding apparatus suitable for making brick, stone, or similar wall sections. Stay means are included in the apparatus so that the wall sections may be removed from the molding structure while the mortar in the wall section is still wet. Power means may, also, be included in one or both embodiments of the apparatus so that even very heavy wall sections may be conveniently removed from the molding apparatus.

I claim:

1. Molding apparatus for forming brick wall sections, comprising structure defining a substantially rectangular, flat, tiltable table structure having two ends and two sides; said structure being selectively tiltable from a horizontal to a vertical position; said structure including side rails and an upper end rail in vertical position; stay means positioned on said structure encircling a brick wall section formed on said structure providing a base support for a wall section; selectively detachable securing means for securing said stay means to said rails; said stay means providing a lower end rail, and said stay means being detachable from said structure so as to remain on a brick wall section formed on said structure and tilted to vertical for removal from rails.

2. Molding apparatus according to claim 1 wherein said structure is pivotably mounted in a base structure so as to pivot about its transverse running line center.

3. Molding apparatus according to claim 1 including spacing means positioned on said flat surface of said table structure for spacing bricks placed thereon.

4. Molding apparatus according to claim 1 wherein said base support is detachable from said stay means.

* * * * *